April 25, 1961 W. F. STREHLOW 2,981,342
CONTROL MECHANISM FOR TRACTOR HYDRAULIC SYSTEM
Filed March 3, 1958 3 Sheets-Sheet 1

Inventor
Walter F. Strehlow
by John P. Hines
Attorney

April 25, 1961  W. F. STREHLOW  2,981,342
CONTROL MECHANISM FOR TRACTOR HYDRAULIC SYSTEM
Filed March 3, 1958  3 Sheets-Sheet 2

Inventor
Walter F. Strehlow
By John P. Hines
Attorney

United States Patent Office 2,981,342
Patented Apr. 25, 1961

2,981,342

CONTROL MECHANISM FOR TRACTOR
HYDRAULIC SYSTEM

Walter F. Strehlow, Wauwatosa, Wis., assignor to Allis-Chalmers Manufacturing Company, Milwaukee, Wis.

Filed Mar. 3, 1958, Ser. No. 718,714

3 Claims. (Cl. 172—8)

My invention pertains generally to hydraulic control mechanism and is more particularly concerned with the mechanism for controlling a tractor hydraulic system which includes an automatic weight transfer system.

For a considerable number of years, farm tractors have been provided with a hydraulic system which lifts and lowers implements attached to the tractor. As time and knowledge progressed, the hydraulic systems became more versatile and recently some tractor hydraulic systems have been adapted to include an automatic weight transfer system. That is a system which automatically increases the weight on the rear wheels of the tractor, thereby increasing the traction. This transfer of weight is accomplished by exerting a lifting force in the tractor lift arms which are attached to the implement. This lifting force has the same effect as hanging a weight on the rear of the tractor. In order to exert this lifting force on the tractor lift arms, a signal must be delivered to a control valve. This signal is, in most cases, derived from a change in draft load exerted on the implement.

Since the change in draft load on the implement gives the signal which results in a weight transfer, it is necessary to transmit this signal from the implement to a control valve which causes a pump to deliver pressure fluid to a hydraulic ram which exerts the lifting force on the lift arms. There must be a definite relationship between the amount of draft change and the amount of lifting force which will be exerted on the lift arms. That is, there must be a relationship between the change in draft load on the implement and the amount of travel of the hydraulic control valve. It is necessary to include manual control means for the tractor operator with which he can adjust this relationship between the change in draft on the implement and the amount of lift applied to the implement. It is also necessary that this manual control means allow the operator to raise and lower the implement. It is desirable that the automatic weight transfer control means and the lift and lower control means be separately controllable. However, cost and space limitations dictate that these two functions be complementary to one another so that a separate hydraulic system wherein a duplication of apparatus would be necessary is not needed.

A general object of my invention is to provide a tractor hydraulic system having a lifting connection with a tractor propelled implement with control mechanism including a draft responsive weight transfer linkage for transmitting a signal from the implement to the hydraulic system and manual control means for adjusting the weight transfer linkage and for raising and lowering the implement without disturbing the adjustment of the weight transfer linkage.

A further object of my invention is to provide a tractor hydraulic system with a two-lever, hand control system for adjusting a weight transfer linkage and for raising and lowering a vehicle propelled implement without disturbing this adjustment.

The foregoing and other objects and advantages of the invention will become more fully apparent from the following description of the invention shown in the accompanying drawings.

Referring to the drawings in which like reference characters designate the same or similar parts of the various views.

Figure 1:
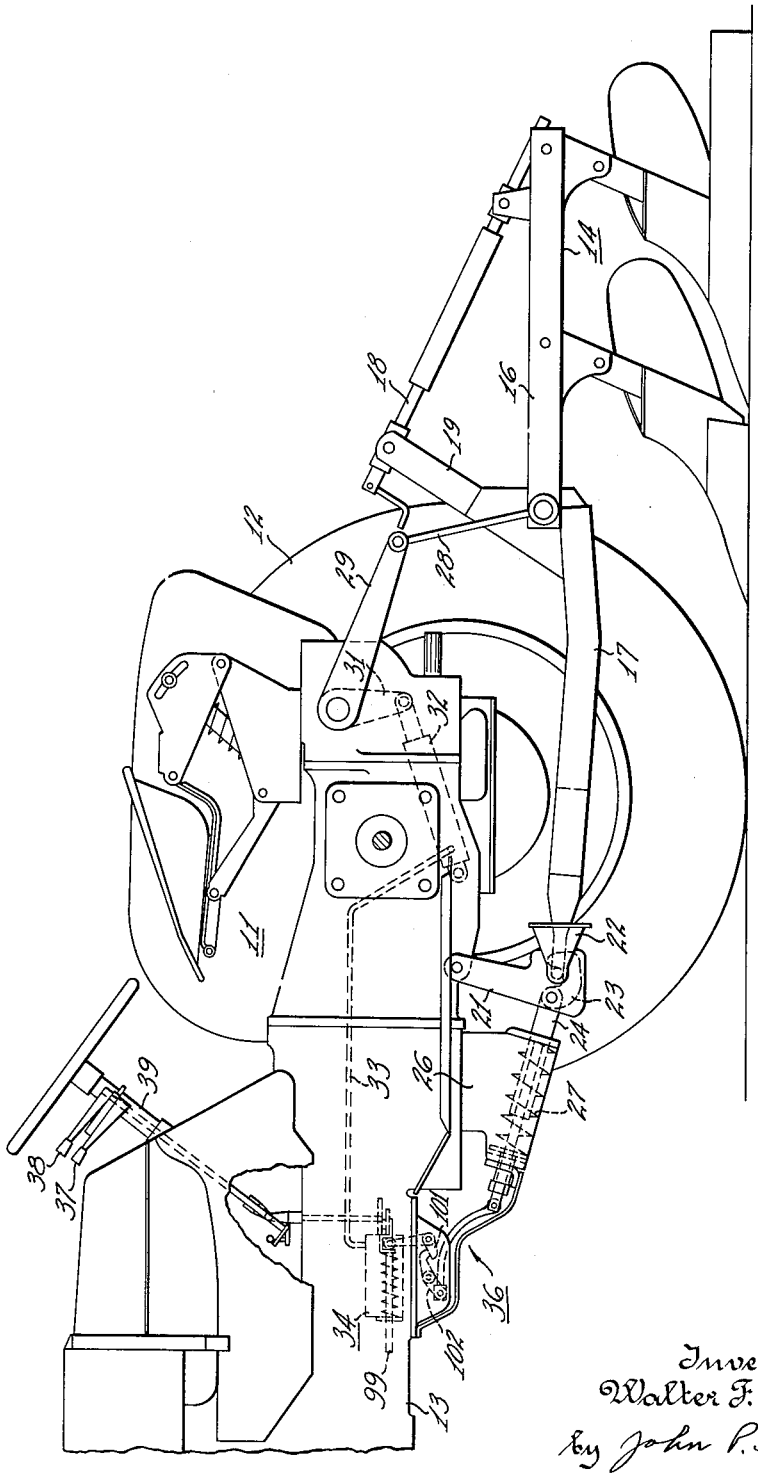
Fig. 1 is a partial view of a side elevation of an implement and tractor combination including apparatus embodying the invention.

Referring to Fig. 1, it will be seen that the invention is shown in conjunction with a vehicle or farm tractor generally designated 11 having rear traction wheels 12 and a tractor frame 13. Attached to the tractor 11 in a rearwardly extending position is a ground working implement or two bottom plow generally designated 14. The ground working implement is composed of two plow bottoms which are both rigidly connected in any conventional manner to a plow beam 16. The plow beam 16 is pivotally connected to a bar member 17. A beaming screw 18 is operatively connected to the plow beam and to a tower 19 which is in turn rigidly connected to the bar member 17. The beaming screw varies the angle between the beam 16 and the bar member 17. As shown in Fig. 1, the plow beam 16 can be pivoted in a counterclockwise direction relative to the bar member 17. In the pivoted position, the points of the plow are pointed downward. As the plow is pulled forward, it penetrates the ground until the bottom of the plow has leveled out approximately parallel to the surface of the ground at a predetermined depth of cut.

A support 21 rigidly fixed in depending relation to the underside of the tractor frame 13 has a bell housing 22 formed thereon which opens in a rearwardly extending direction. A hook 23 pivotally connected to a rod 24 is positioned within the bell housing 23. The rod 24 is supported for reciprocating movement in a spring housing 26 supported in depending relation to the underside of the tractor frame. A compression spring or hydraulic pump regulating spring 27 is operatively contained within the spring housing 26 in a preloaded condition and resists reciprocating movement of the rod 24.

The forward end of the bar member 17 has an eye thereon for engagement with the hook 23. The forward end of the bar member is guided into the bell housing and slips over the hook providing a draft transmitting connection between the plow and the tractor. The plow also has a nondraft transmitting connection with the tractor. A lift rod 28 is connected to the plow at the pivot connection between the plow beam 16 and the bar member 17. The pivot connection between the plow beam and the bar member is such that the plow beam will not move in a clockwise direction (as viewed in Fig. 1) relative to the bar member 17 beyond the position shown in Fig. 1. With this pivot connection and the lift rod connected at the pivot between the plow beam and the bar member the plow beam and the bar member can be lifted as a unit. The upper end of the lift rod is connected to a lift arm 29 which is journaled on the tractor frame. A crank arm 31 is connected to the lift arm 29 in any conventional manner so that no relative movement is possible between these arms. A hydraulic ram 32 supported on the tractor frame has a piston rod operatively contained therein which is connected to the lower end of the crank arm 31. Actuation of the piston rod moves the lift arm which in turn exerts a lifting force on the implement.

The hydraulic ram 32 is actuated by pressure fluid delivered to the ram through conduit 33 from a fluid pump 34. A control valve associated with the pump varies the volume of fluid delivered to the ram. The control valve is in turn controlled by two sources. The first source of control is a weight transfer linkage generally designated 36 which connects the spring bias rod 24 to the control valve. This weight transfer linkage transposes a change in the draft load on the implement into movement of the control valve which in turn directs fluid to the hydraulic ram. If the draft load increases, the control valve allows fluid to enter the hydraulic ram resulting in a lifting force being exerted on the implement. If the draft load is decreased, the control valve allows some of the fluid to drain from the ram and the lifting force being exerted on the implement is decreased.

The second source of control for the hydraulic control valve is in the hand levers 37 and 38 mounted on the steering column 39. The first or lift and lower lever 37 is selectively positionable to cause the control valve to allow fluid to be pumped to the hydraulic ram resulting in a lifting of the implement. This lever is also positionable to cause the control valve to allow fluid to drain from the ram resulting in a lowering of the implement. The second or weight transfer lever 38 is selectively positionable to vary the amount of displacement required of the rod 24 to cause a predetermined lifting effort to be exerted by the lift arm 29 on the implement.

Figures 2, 3:
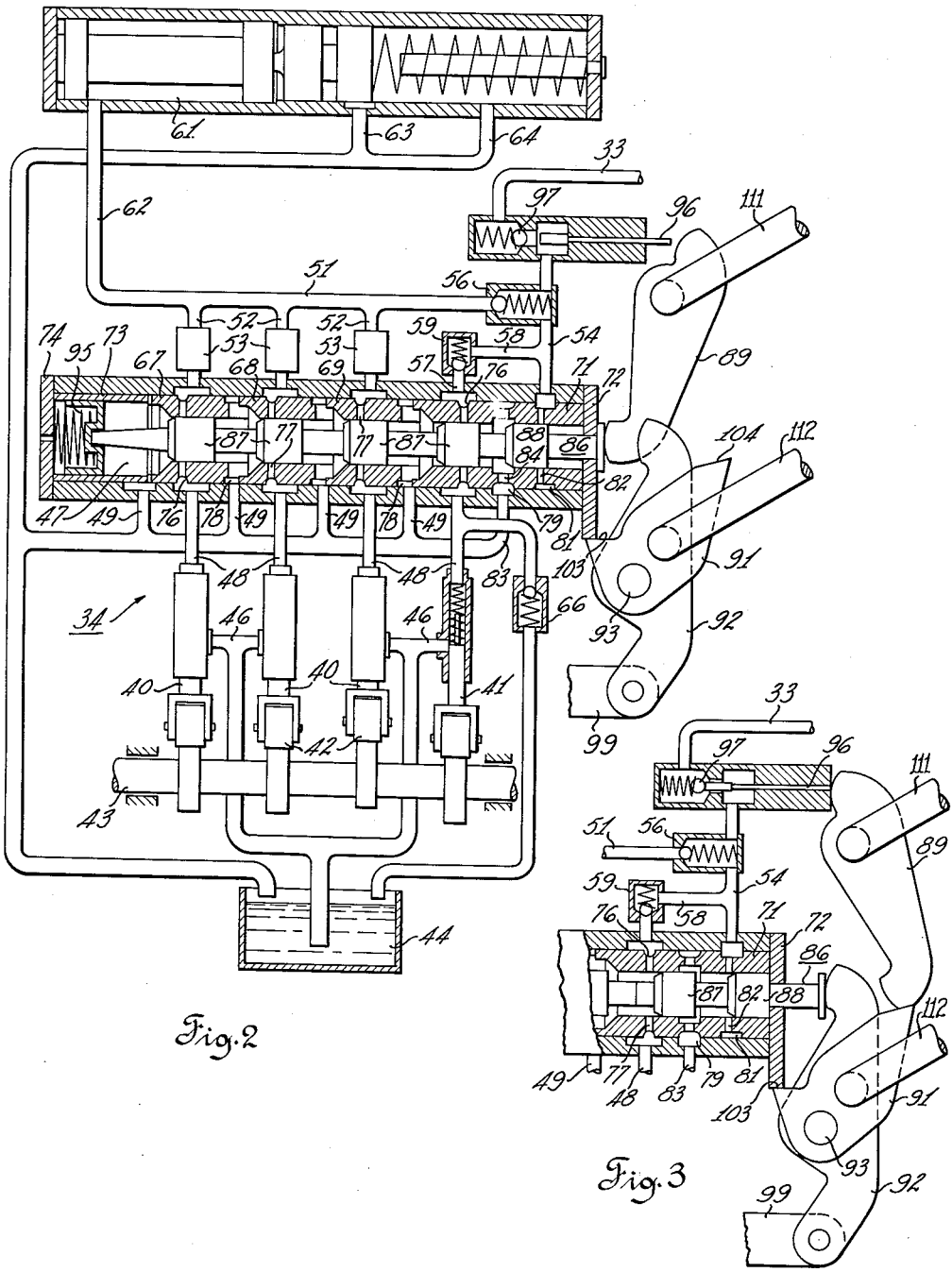
Fig. 2 is a schematic showing of a hydraulic pump and valve apparatus and the control members for actuating this apparatus.
Fig. 3 is a view similar to Fig. 2 showing the apparatus and control members in a different operating position.

Referring to Fig. 2, the hydraulic pump 34 is preferably of the constant delivery multiple piston type. The pump pistons 40 and 41 are driven through cam follower rollers 42 which are in turn driven by cams mounted on a camshaft 43. Fluid from a reservoir 44 is delivered to the pump cylinders through the intake passages 46. Fluid flows into each pump cylinder when the pistons 40 and 41 are in a lowered position and as the pistons are driven upward by the cam followers the intake passages are closed off and the fluid is pressurized. The pressurized fluid is delivered to a control valve chamber 47 by pump discharge passages 48. Adjacent to each discharge passage is a bypass passage 49 which connects the control valve chamber with the fluid reservoir 44. In the preferred embodiment a pressure manifold 51 is connected with the valve chamber 47 through a group of transfer passages 52. Each transfer passage is provided with a spring biased ball check valve 53. These valves require only a minimum amount of pressure to open the transfer passage from the valve chamber 47 to the manifold 51. As viewed in Fig. 2, the right hand end of the pressure manifold is connected in fluid communication with a working fluid passage 54. Communication between the working fluid passage and the pressure manifold is controlled by another spring biased ball check valve 56 preventing the backflow of fluid from the working fluid passage into the manifold.

In the preferred embodiment, I have shown the right hand piston 41 smaller in diameter than the three other pistons 40. It should be noted that the small pump 41 is not connected to the pressure manifold 51. In diametrically opposed relation to the small pump piston discharge passage 48 is another transfer passage 57 in communication with the control valve chamber 47. The transfer passage 57 is connected to the working fluid passage 54 through a linking passage 58. A ball check valve 59 is provided in the linking passage to block the return flow of fluid from the linking passage to the control valve chamber.

As viewed in Fig. 2, the left hand end of the pressure manifold 51 communicates with an adjacent end of an unloading valve 61 by means of a connecting passage 62. The right hand portion of the unloading valve has two discharge ports 63 and 64 opening through the side surface of the housing and connecting the right hand portion of the unloading valve chamber with the fluid reservoir. The unloading valve is of the usual type which requires a relatively high pressure to initially unseat the valve but which requires only a small pressure to keep the valve open.

A pressure relief valve 66 is provided between the pressure side of the small pump piston 41 and the fluid reservoir 44. This relief valve is adjustable to connect the discharge side of the small piston to the fluid reservoir when the fluid from this piston has reached a predetermined pressure.

A cylindrical liner comprising axially separable sections 67, 68 69 and 71 is disposed in cylindrical control valve chamber 47 with the right hand section 71 abutting a cover plate 72. A sleeve 73 abuts cover plate 74 and holds left hand liner section 67 in place. The cylindrical liner sections are provided with circumferential grooves 76 placing the pump discharge passages 48 in communication with the diametrically opposed transfer passages 52 and 57. In addition, each section is provided with a transverse bore 77 placing the interior of the liner in communication with the grooves 76. The ends of the liner sections which abut one another are complementary shaped to form annular grooves 78. These latter grooves 78 together with the relieved left hand end abutting portions of the liner sections 67, 68 and 69 combine to place the interior of the cylindrical liner in fluid communication with bypass passages 49. In addition, the right hand liner section 71 is provided with two circumferential grooves 79 and 81. Groove 81 communicates with the working fluid passage 54. A transverse bore 82 through the liner section 71 places diametrically opposed portions of groove 81 in communication with the interior of the liner section 71. The groove 79 communicates with a main return passage 83 and with the interior of the cylindrical liner through transverse bore 84.

A cylindrical control valve plunger 86 is positioned in the cylindrical liner sections for sliding movement relative thereto. There is a separate valve plunger element 87 for each pump piston. There is also an additional valve plunger element 88 in the right hand end of the cylindrical control valve chamber for coaction with circumferential groove 81. This cylindrical element controls the flow of fluid through the groove 81 from the working fluid passage 54 to the return passage 83.

The bypass passages 49 connect the interior of the control valve chamber with the fluid return line 83. The valve plunger elements 87 and 88 are so shaped and positioned in the control valve liner sections that when the control valve plunger is in the extreme right hand position or full lower position as shown in Fig. 3, the fluid from each of the four pump pistons passes into the cylindrical control valve chamber and out through the bypass passages 49 to the fluid reservoir 44. When the main control valve plunger 86 is moved to the left, as shown in Fig. 2, these bypass passages are blocked off by the valve plunger elements 87. The fluid is directed through the circumferential grooves 76 to the working fluid passage by means of the linking fluid passage 58 and the pressure manifold 51. The control valve liner sections 67—71 are so positioned relative to the valve plunger elements 87 and 88 that the control valve plunger can be positioned so that pressure fluid from each pump, starting with the small pump, can be successively delivered to the working fluid passage.

A more complete description of the internal mechanism and workings of the pump plungers and the control valve and the unloading valve can be found in a copending application, S.N. 712,471, filed January 31, 1958, now Patent No. 2,926,496.

Figure 4:
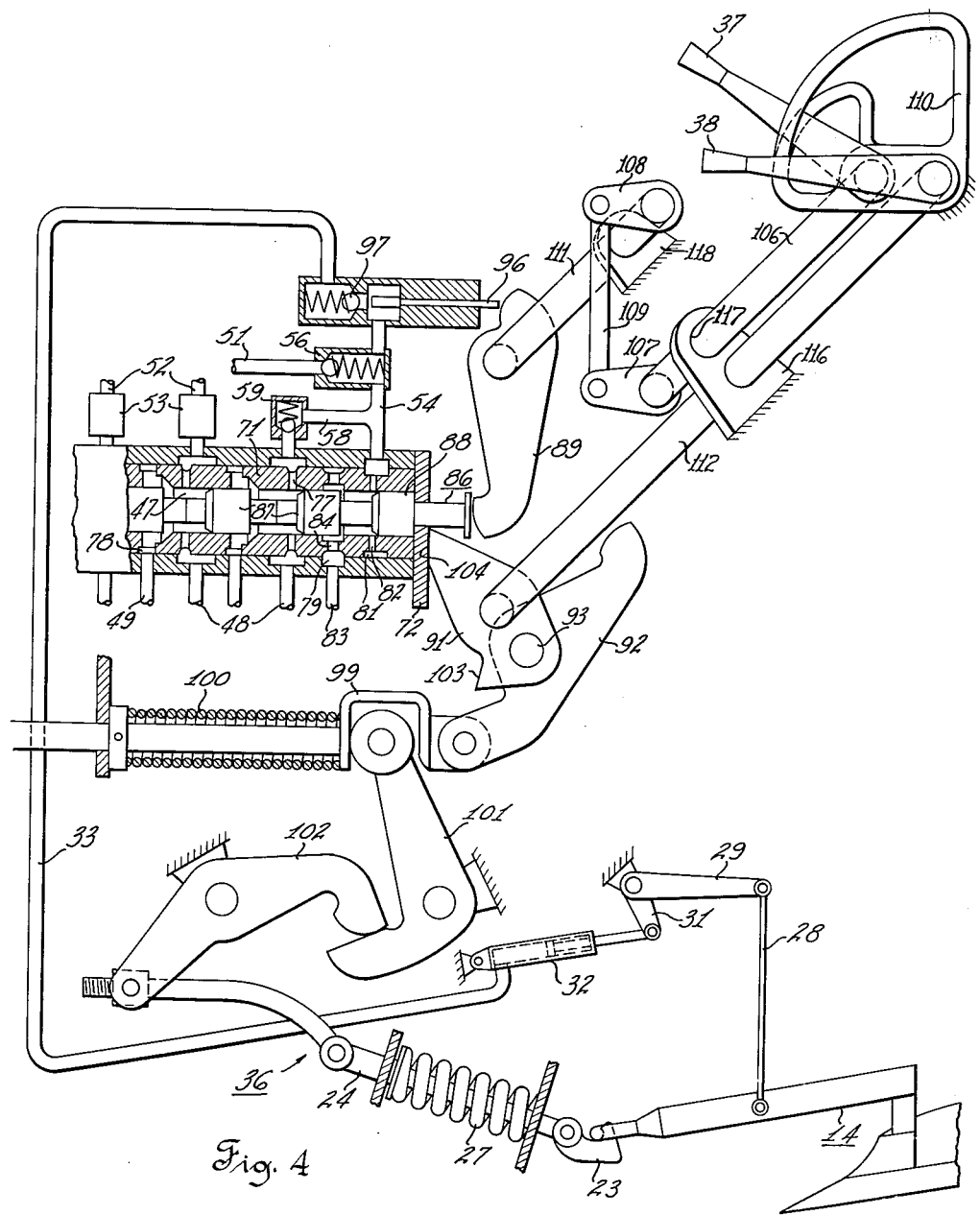
Fig. 4 is a schematic showing of the control mechanism for the hydraulic pump and valve apparatus.

Referring to Fig. 4, the lift and lower hand lever 37 and rod 106 are secured to one another for rotation in unison in a hole in stationary control lever quadrant 110 which is nonrotatably secured to the tractor. The shaft 106 is also journaled in a stationary part 116 of the tractor, through its fit within a bore 117. A crank 107 is secured to rod 106 for rotation therewith. The free end of crank 107 is pivotally connected to one end of a drag link 109. The other end of drag link 109 is pivotally connected to the free end of a crank 108 secured for rotation with a rod 111. Rod 111 is rotatably journaled in a part 118 secured to the tractor. The lower end of rod 111 and member 89 are secured to one another for rotation in unison. Thus a first manual control including lever 37, rod 106, crank 107, drag link 109, crank 108 and rod 111 is provided for moving member 89. Upon clockwise movement of lever 37, the member 89 is moved to an implement raising position, as shown in Fig. 2, in which it causes the main control valve 86 to occupy its implement raising position in which fluid from the pumps is directed through a check valve in the form of ball valve 97 to the fluid motor in the form of ram 32. Upon counterclockwise movement of lever 37 the member 89 is moved to its implement lowering position, as shown in Fig. 3, in which member 89 moves a check valve 97 off its seat to its position permitting fluid flow from said motor 32 and the main control valve is permitted to occupy its implement lowering position. Upon movement of the lever 37 to an intermediate position between right and left positions relative to the quadrant 110, the member 89 will be moved to an implement holding position, as shown in Fig. 4, in which it permits the check valve to occupy its position preventing fluid flow from the motor, which in the illustrated embodiment of the invention is a seated position of the ball valve 97. In the holding position the member 89 is out of touch with the valve spool 86 thereby permitting the main control valve to occupy its implement lowering position.

The use of a check valve to prevent fluid from flowing from the ram 32 is particularly advantageous in that check valves (valves blocking flow in one direction upon movement of a sealing member into sealing abutment with a member carrying a fluid passage) are leakproof to a greater degree than spool valves. Thus when a mounted implement such as the plow 14 is being transported in a raised position the member 89 is moved to a hold position and the check valve 97 prevents lowering. Since a check valve such as the ball check valve illustrated positively prevents leakage there is no problem of the implement lowering due to valve leakage as would be the usual problem if a spool valve were used.

When the lift and lower hand control lever 37 is moved into a full lift position the lift and lower member 89 rotates clockwise, contacting control valve plunger 86 forcing all the plunger elements to the extreme left until the neck of the plunger has stopped against plate 72. The lift and lower member 89 has allowed hold positioning valve plunger 96 to remain in its extreme outward position so that the ball valve 97 can remain seated. If the control valve plunger is held in this position the implement will be raised to a full lift position and the unloading valve will then direct the fluid from the three large pistons back to the fluid reservoir and the relief valve 66 will direct the fluid from the small pump piston back to the reservoir.

If it is desired to raise the implement to the position shown in Fig. 4, which is less than a full lift position, the lift and lower member 89 is brought into engagement with the control valve plunger 86 so that pressure fluid is delivered to the hydraulic ram 32. When the implement has been raised to the desired position, the lift and lower hand control lever 37 is moved to a "hold" position. This "hold" position is between the maximum lift and complete lower position on the lift and lower hand control lever quadrant. As shown in Fig. 4, the long end of the lift and lower member 89 is out of contact with the main control valve plunger 86 and this valve plunger is forced outward to a full lower position by a coil spring 95 which biases the valve to a full lower position. The short end of the lift and lower member is not contacting the hold positioning valve plunger 96 and the fluid in the hydraulic ram is trapped by the ball valve 97. All four pumps are delivering fluid to the reservoir through the bypass passages 49 and the implement is held in the desired position by the fluid trapped in the ram beyond the hold positioning ball valve 97.

When the lift and lower hand control lever 37 is moved to its lower position the lift and lower member 89 is caused to rotate in a counterclockwise direction. Its short end forces plunger 96 inward causing ball 97 in the hold positioning valve to be forced off its seat. The fluid trapped in the hydraulic ram is allowed to escape by the ball valve 97 through the working fluid passage 54, through the control valve chamber and out the return passage 83 to the reservoir 44. When the lift and lower member is in a full lower position the longer end of the member has left contact with the control valve plunger 86 and all of the pumps are pumping through the bypass passages 49 to the fluid reservoir.

Automatic weight transfer is provided by the weight transfer member 92 acting on the control valve plunger 86. Actuation of the member 92 is provided through the weight transfer linkage 36. This linkage comprises a spring biased plunger 99 pivotally connected to the lower end of weight transfer member 92; and a cam 101 in contact with the plunger 99 and urged thereby into contact with a cam lever 102; cam lever 102 having one end connected to the rod 24. An increased draft load on the implement 14 tends to rotate cam lever 102 in a counterclockwise direction. Cam 101 follows cam lever 102 as it rotates in a clockwise direction under urging from the spring biased plunger 99. Movement of the spring biased plunger to the right results in a counterclockwise rotation of the weight transfer member 92 about its fulcrum point 93 into engagement with the control valve plunger 86.

The weight transfer linkage 36 performs the additional function of protecting the control valve from sudden large shock loads which may be imposed on the rod 24. If a stump or some similar object is struck by the plow 14, a considerable pull is exerted on the rod 24. This force is not transmitted to the valve plunger 86 because of the nonpositive connection between cam 101 and cam lever 102. Regardless of the magnitude of the pulling force on rod 24, the force with which member 92 contacts plunger 86 is limited to the force of the spring 100. Furthermore, the spring 100 will cushion a force in the opposite direction resulting from a sudden release of a draft load.

It should be noted that the fulcrum point 93 for the weight transfer member 92 is on an arm 91.

A second member or weight transfer member 92 is pivotally connected by a pivot pin, constituting a fulcrum point, to crank arm 91 of a second manual control. The crank arm 91 is nonrotatably secured to a rod 112 which is rotatably supported on the tractor by the part 116 and quadrant 110. At the upper end of rotatable rod 112, a hand lever 38 is secured for rotation therewith. Thus the second manual control includes lever 38, rod 112 and arm 91. Upon clockwise rotation of the lever 38 the fulcrum point 93 between arm 91 and member 92 moves forward (to the left as illustrated) thereby shortening the spacing between the upper end of member 92 and valve spool 86. This arm is controlled by the weight transfer lever 38. As shown in Figs. 2 and 3, the arm 91 has been moved in a clockwise direction until the stop 103 contacts the plate 72. In this position a small increase in the draft load will cause the weight transfer member 92 to move the control valve plunger 86 resulting in fluid being pumped to the ram and the lift arms exerting a lifting force on the implement. As shown in Fig. 4, the arm 91 has been pivoted in a counterclockwise direction until the stop 104 contacts the plate 72. In this position, the fulcrum 93 has been moved away from the control valve moving the weight transfer member 92 further away from contact with the control valve plunger. In this position, if there is a slight increase in draft resulting in a small amount of counterclockwise rotation of the weight transfer member 92, no lifting force will be exerted by the lift arms as the control valve plunger is not moved to a lifting position.

In describing the operation of my invention, I will assume that the plow shown in Fig. 1 has been beamed for a depth of eight inches. That is the angle between the plow beam 16 and the bar member 17 is such that the plow will assume a condition generally parallel to the surface of the ground at a depth of eight inches. The lift and lower hand control lever 37 has been moved to a full lower position resulting in the member 89 being positioned as shown in Fig. 3. The lift and lower member has pushed the valve ball 97 off its seat so that fluid can flow in either direction through the hold positioning valve. In this condition with the plow in the ground and the tractor stopped, no lifting force is being exerted by the lift arms. It is next necessary for the operator to position the fulcrum point 93 of the weight transfer member 92 by movement of the weight transfer hand lever 38. The optimum position of this fulcrum point will vary for different plowing conditions. After plowing a particular field for a short period of time, the operator will be able to determine the optimum setting of the fulcrum point for that particular field. If the soil condition of the field varies from a very light soil to an extremely heavy soil, the position of the freely swinging link should approach the position shown in Fig. 4. That is, the fulcrum 93 for the weight transfer member 92 should be swung away from the valve plunger 86. In this position, if there is a sudden large increase in the draft load on the implement, an excessive amount of weight will not be transferred. If the soil conditions vary only slightly from a normal condition to a slightly heavy or to a slightly lighter condition, the fulcrum should be positioned as shown in Fig. 3. That is, the fulcrum should be swung toward the valve plunger. In this position a slight change in draft load on the implement will result in weight being transferred to the rear wheels of the tractor. In explaining the positioning of the fulcrum point, I wish to point out that there is a certain amount of difficulty in arriving at an ideal setting. It is, therefore, advantageous to be able to set the fulcrum point when the plowing operation begins and to be able to complete the plowing operation without having to reset the fulcrum point.

With the fulcrum point 93 positioned in its optimum point, the plow is pulled through the ground. If the load on the drawbar increases the weight transfer member 92 moves the control valve to the left and fluid is pumped to the ram exerting a lifting force on the implement. This lifting force results in a portion of the implement weight being transferred to the rear wheels of the tractor. If the load on the drawbar decreases, the weight transfer member moves in a clockwise direction allowing the spring biased control valve plunger to move to the right and fluid to escape through the control valve chamber back to the reservoir.

When the end of the field is reached, it is necessary to raise the implement and turn around for the next plowing operation. It would be quite undesirable if it was necessary to destroy the weight transfer setting of the fulcrum 93 every time it was necessary to raise the implement at the end of a plowed row. With my invention, it is not necessary to disturb this setting until it is desired to change the setting to more efficiently utilize the weight transfer system. When the end of a row has been reached, the lift and lower hand control lever 37 is moved to a full lift condition. This causes the lift and lower member 89 to be rotated in a clockwise direction contacting the control valve plunger 86 and moving it to the extreme left, as shown in Fig. 2. All of the pistons immediately deliver fluid to the ram which lifts the implement from the ground. When the implement has been fully lifted, the three large pistons 40 deliver the pressure fluid through the unloading valve 61 back to the reservoir and the small piston 41 delivers the pressure fluid through the relief valve 66 back to the reservoir. After the tractor has been turned around and is ready for the next plowing operation, the lift and lower hand control lever is moved to a full lower position. This pivots the lift and lower member 89 in a counterclockwise direction removing it from contact with the control valve plunger 86 and bringing it into engagement with the hold positioning valve plunger 96 which removes the ball valve 97 from its seat. The implement seeks the depth for which it is beamed and the optimum weight transfer setting of the fulcrum point has not been disturbed.

It is also possible to hold the implement in any position between a maximum raised position and a full lowered position without disturbing the setting of the weight transfer fulcrum point. This can be accomplished by moving the lift and lower hand control lever 37 to a lift position which results in the pump delivering pressure fluid to the hydraulic ram. By watching the lift arms, the operator can tell when they have reached the desired raised position. At this point it is only necessary to move the lift and lower hand control lever between the full lower position and the full raise position. In this position, shown in Fig. 4, the lift and lower member is out of engagement with both the hold positioning valve plunger 96 and the main control valve plunger 86. In this position the pistons are directing the pressure fluid through the by-pass passages back to the reservoir. The fluid in the ram is trapped by the hold positioning ball valve and the implement is retained in the desired position.

Utilizing a separate hold position valve gives rise to an additional unobvious benefit. By using the two valves illustrated, it is possible to utilize the different lowering characteristics inherent in ball and spool valves to good advantage. The ball valve for instance produces desirable flow characteristics for controlled or restricted lowering of equipment, whereas the spool valve is ideal for providing lowering during weight transfer operation, that is during the time the draft load signals through the weight transfer linkage 36 for less raising force to be exerted by motor 32.

It will be apparent to those skilled in the art that various changes and modifications may be made in the embodiment of the invention illustrated and described herein without departing from the spirit of the invention or from the scope of the appended claims.

What is claimed is:

1. In a hydraulic system for a farm tractor of the type having means for connecting an implement in draft transmitting relation to the tractor, a fluid responsive motor for raising and lowering the implement, a fluid sump, and a fluid pump for supplying pressure fluid to the motor, a control mechanism for the hydraulic system comprising: a first valve controlling the flow of fluid from said pump to said motor and from said motor to said sump, said first valve being shiftable to implement raising and implement lowering positions; a second valve movable to a position preventing fluid flow from said motor and to a position permitting fluid flow to and from said motor; said valves being connected in series between said pump and motor with said first valve being intermediate said pump and second valve; a first member supported on said tractor for movement to an implement raising position in which it causes said first valve to occupy its raising position, to an implement holding position in which it permits said first valve to occupy its lowering position and said second valve to occupy its position preventing fluid flow from said motor, and to an implement lowering position in which said first valve is permitted to occupy its lowering position and said second valve is moved to its position permitting fluid flow from said motor; a second member mounted on said tractor independently of said first member operable to move said first valve to its raising position upon movement in one direction and permitting said first valve to occupy its lowering position upon movement in the opposite direction; means biasing said first valve toward its lowering position; means connecting said second member to said implement for transposing a change in draft on said implement into movement of said second member; a first manual control movably supported on said tractor and connected to said first member to selectively move the latter to its raising, hold and lowering positions; and a second manual control independent of said first manual control movably supported on said tractor and connected to said second member whereby movement of second manual control changes the extent to which said second valve means is moved by said second member by a predetermined draft on said implement.

2. The structure set forth in claim 1 wherein said second valve is a check valve and said first valve is a spool valve.

3. The structure set forth in claim 1 wherein movement of said second manual control changes the distance between said second member and said first valve.

References Cited in the file of this patent

UNITED STATES PATENTS

| | | |
|---|---|---|
| 2,611,306 | Strehlow et al. | Sept. 23, 1952 |
| 2,631,514 | Roeder | Mar. 17, 1953 |
| 2,722,873 | Garmager | Nov. 8, 1955 |
| 2,786,402 | Senkowski | Mar. 26, 1957 |
| 2,832,276 | Heitshu | Apr. 29, 1958 |
| 2,864,295 | DuShane | Dec. 16, 1958 |

FOREIGN PATENTS

| | | |
|---|---|---|
| 1,075,023 | France | Apr. 7, 1954 |